United States Patent [19]

Keller

[11] Patent Number: 5,464,926

[45] Date of Patent: Nov. 7, 1995

[54] SYNTHESIS AND POLYMERIZATION OF OLIGOMERIC MULTIPLE AROMATIC ETHER-CONTAINING PHTHALONITRILES

[75] Inventor: Teddy M. Keller, Alexandria, Va.

[73] Assignee: The United States of America as represented by the Secretary of the Navy, Washington, D.C.

[21] Appl. No.: 280,969

[22] Filed: Jul. 27, 1994

Related U.S. Application Data

[62] Division of Ser. No. 19,373, Feb. 18, 1993, Pat. No. 5,352,760.

[51] Int. Cl.$^6$ ..................................................... C08G 65/00
[52] U.S. Cl. .................... 528/206; 528/125; 528/126; 528/128; 528/207; 528/209; 528/210; 528/211; 528/220; 528/228; 528/9
[58] Field of Search ................................ 528/9, 170, 172, 528/166, 171, 206, 210, 173, 183, 188, 206–208, 337, 352, 353

[56] References Cited

U.S. PATENT DOCUMENTS

| | | | |
|---|---|---|---|
| 4,234,712 | 11/1980 | Keller et al. | 528/9 |
| 4,409,382 | 10/1983 | Keller | 528/173 |
| 5,003,039 | 3/1991 | Keller | 528/362 |
| 5,132,396 | 7/1992 | Keller | 528/353 |
| 5,237,045 | 8/1993 | Burchill et al. | 528/362 |
| 5,247,060 | 9/1993 | Keller | 528/362 |

*Primary Examiner*—Nathan M. Nutter
*Assistant Examiner*—Richard Jones
*Attorney, Agent, or Firm*—Thomas E. McDonnell; Barry A. Edelberg

[57] ABSTRACT

Oligomeric monomers are produced by reaction of a bisphenol compound with either a dihalobenzophenone or a (2,2)bis(4-halophenyl)hexafluoropropane and any other activated halogen containing aromatic compounds in the presence of a base and an appropriate solvent. The resulting oligomeric product, a dialkaline bisphenate terminated salt, is then reacted with 4-nitrophthalonitrile to form an oligomer-based phthalonitrile. These oligomers, in the presence or absence of an curing agent, may then be heated to form high temperature thermosetting polymers. These polymers can potentially be used as advanced materials for composites, as adhesives, and for microelectronic applications.

11 Claims, No Drawings

SYNTHESIS AND POLYMERIZATION OF OLIGOMERIC MULTIPLE AROMATIC ETHER-CONTAINING PHTHALONITRILES

This is a division of application Ser. No. 08/019,373, filed Feb. 18, 1993, to Teddy M. Keller, titled POLYMERIZATION OF OLIGOMERIC MULTIPLE AROMATIC ETHER-CONTAINING PHTHALONITRILES, now U.S. Pat. No. 5,352,760.

BACKGROUND OF THE INVENTION

1. Field of the Invention

This invention relates, in general, to high-temperature materials and, in particular, to a new class of oligomeric arylether-containing phthalonitriles containing of varying average molecular weight, their conversion to high-temperature thermosetting polymers, and the synthesis thereof.

2. Description of the Background Art

Phthalonitrile polymers constitute a recent and important class of high-temperature materials, having a wide range of uses, such as composite matrices, adhesives, sealants, and even semiconductors. These polymers have been developed to address the shortcomings of current commercially available thermosetting resins. For example, U.S. Pat. No. 4,409,382, (the entirety of which is incorporated by reference) to Keller, discloses a family of phthalonitrile polymers related to that of the present invention.

Phthalonitrile polymers are prepared from phthalonitriles in which the linking group between the two ortho dinitrile groups separates the dinitrile groups enough to permit polymerization. This polymerization takes place through the nitrile groups by an addition mechanism yielding heterocyclic crosslinked products known to exhibit good thermal and oxidative properties. The phthalonitrile resins can be reacted to a prepolymer stage and stored indefinitely at room temperature without further reaction. The polymerization occurs above the melting point or glass transition temperature and is controlled as a function of the amount of curing additive and the curing temperature.

Several aromatic phthalonitrile resins with ether, thioether, sulfone, and imide linkages have been previously reported and patented. When the melt of the monomers are heated in the absence or presence of metallic or organic nucleophilic co-reactants, e.g., aromatic amines, polymerization occurs to afford thermosetting polymeric materials which exhibit superior thermo-oxidative properties relative to currently used commercial high temperature polymers. When fully cured, these polymers exhibit glass transition temperatures in excess of 400° C.

SUMMARY OF THE INVENTION

Accordingly, an object of this invention is to synthesize phthalonitrile monomers, polymers and copolymers with excellent thermal and oxidative properties and good mechanical properties in excess of 300° C.

And, an object of this invention is to produce polymeric materials for composite matrices to be used in applications where the use temperature is above the operating temperature for conventional high-temperature polymers and below the operating temperature for ceramics or metals.

Further, an object of this invention is to provide new type of phthalonitrile resins having aryl ether linkages in the bridge connecting the terminal phthalonitrile polymerizable units.

These and other objects are accomplished by reacting an excess amount of bis dihydroxyaryl compound with either a dihalobenzophenone or a 2,2-bis(4-halophenyl)hexafluoropropane in the presence of a base and an appropriate solvent. The initially formed oligomeric arylether-terminated salt is then reacted with 3- or 4-nitrophthalonitrile or any 3- or 4-halosubstituted phthalonitrile to form a phthalonitrile-based oligomer. This phthalonitrile-based oligomer is then cured in the melt state, in the presence or absence of an curing agent, to form a thermosetting polymer.

DESCRIPTION OF THE PREFERRED EMBODIMENTS

Thermosetting phthalonitrile polymers according to the present invention are made according to the following reaction scheme:

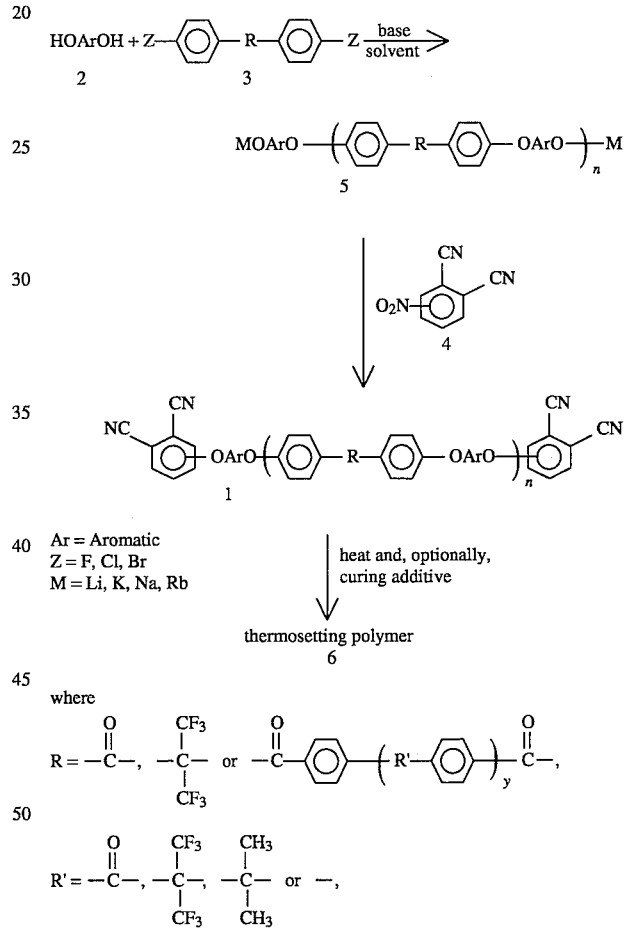

Ar = Aromatic
Z = F, Cl, Br
M = Li, K, Na, Rb where $$R = -\overset{O}{\underset{\|}{C}}-, \quad -\underset{\underset{CF_3}{|}}{\overset{\overset{CF_3}{|}}{C}}- \quad \text{or} \quad -\overset{O}{\underset{\|}{C}}-\!\!\!\left\langle\bigcirc\right\rangle\!\!\!-\!\!\left(R'\!\!-\!\!\left\langle\bigcirc\right\rangle\right)_y\!\!\!-\overset{O}{\underset{\|}{C}}-,$$

$$R' = -\overset{O}{\underset{\|}{C}}-, \quad -\underset{\underset{CF_3}{|}}{\overset{\overset{CF_3}{|}}{C}}-, \quad -\underset{\underset{CH_3}{|}}{\overset{\overset{CH_3}{|}}{C}}- \quad \text{or} \quad -,$$

y is 0 through 4 and preferably 0 or 1. Throughout the present specification, and the claims that follow, the symbol "—", when used in describing compound or a substituent thereof, is defined as a single bond.

Typically, n has an average value of from 1 to about 100. Ar may be any aromatic group, but typically includes from 1 to 3 rings. Where Ar includes multiple aromatic rings, the rings may be attached directly or through an aliphatic group, sulfur or oxygen. For example, Ar may be a phenylene, diphenylene, terpenylene, anthracenediyl, naphthalendiyl or phenanthrenediyl moiety. Typically Ar is a phenylene moiety or a diphenylene moiety.

Preferably, Ar is selected from the group consisting of:

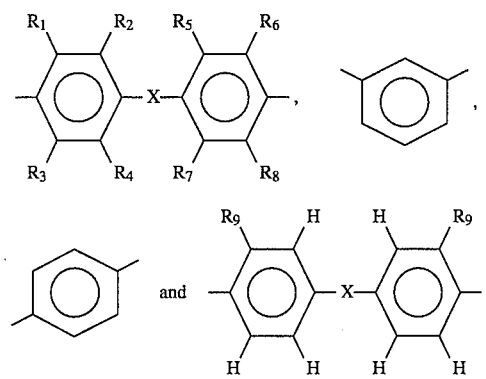

wherein X is selected from the group consisting of

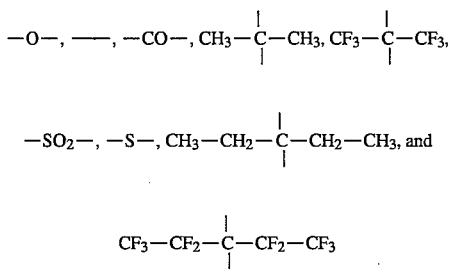

and $R_1$, $R_2$, $R_3$, $R_4$, $R_5$, $R_6$, $R_7$ and $R_8$ are selected from the group consisting of hydrogen, fluoride, methyl and ethyl, and $R_9$ is selected from the group consisting of bromine, chlorine and fluorine. Typically, $R_1$ through $R_8$ are hydrogen. The most preferred groups for "X" are

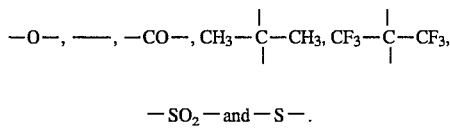

The least expensive groups are

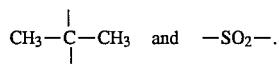

Substitutions on the benzene rings generally lower the thermal stability and resistance to u.v. light; but they increase other desirable properties. For example, fluorinated rings coupled with "X" representing $C_3F_6$ or $C_5F_{10}$ would provide an extremely hydrophobic and oleophilic polymer which would have great value as a coating, sealant, or adhesive. If a bromide or chloride is substituted on the benzene rings of "Ar", the resulting polymer would be highly flame retardant. This diversity of groups represented by "Ar" is a major advantage of the polymers according to the present invention.

The reaction of and 2 and 3 to form 5 is preferably done by admixing 2 and 3 in an inert, oxygen-free atmosphere with an inorganic base such as, e.g., potassium carbonate, potassium bicarbonate, sodium carbonate, sodium bicarbonate or sodium hydride, in a solvent system consisting of a dipolar aprotic solvent (e.g., dimethylacetamide, dimethylformamide, dimethylsulfoxide and N-methyl pyrrolidinone) and either benzene, toluene, chlorobenzene, or any other inert, aromatic, low-boiling point refluxing medium to remove the water formed as a by-product and thus produce a dialkaline metal bisphenate terminated salt 5. Alternatively, a strong base such as alkali metal hydroxide (sodium, potassium or lithium hydroxide) can be used to afford 5 from the reaction of 2 and 3. The reaction mixture is refluxed (typically at about 145°–165° C. for about 12–18 hours) until the initial reaction involving 2 and 3 has gone to completion to afford 5. All water is azeotroped from the system. The low boiling point refluxing medium or solvent is then evaporated by distillation, leaving a solution of the dialkaline bisphenate terminated salt 5 in the dipolar aprotic solvent.

After cooling to a temperature from about 25° to 110° C., preferably 65° to about 85° C., and most preferably from about 70° to about 80° C., a stoichiometric amount of the oligomer is admixed with 4-nitrophthalonitrile in the same solvent system as before until the reaction is complete, generally on the order of about 5 to about 10 hours.

The product mixture is then poured into cold or room temperature water, or an water-$C_{1-3}$ alcohol solution (typically of 10 to 50 vol. % alcohol), to form an oligomeric phthalonitrile monomer 1. The solid precipitate is then collected by, e.g., suction filtration; washed with water; water-$C_{1-3}$ alcohol solution (typically of 10 to 50 vol. % alcohol) or alternating water and $C_{1-3}$ alcohol washes; and dried, preferably in an oven at reduced pressure (typically from about 0.1 to about 0.75 atm, preferably from about 0.5 to about 0.75 atm), leaving the oligomeric phthalonitrile of the present invention.

Depending on the chain length, the character of the polymers from the oligomeric monomer or monomers can be either thermosetting or thermoplastic. Polymers from oligomeric monomers with n from 1 to around 25 are thermosetting. Polymers from monomers with n greater than 25 behave as thermoplastics due to the predominant effect of the inner connecting moiety between the terminating phthalonitrile units. It should be noted that the transition in properties from thermosetting to thermoplastic is gradual with no definite transition point. Monomers with n from 1 to 4 are easy to polymerize because the oligomer melts, thus allowing the molecules to maneuver into position for polymerization. On the other hand, monomers with n greater than 25, and or more particularly greater than 50 or 100, are more difficult to polymerize uniformly and void-free on account of the high viscosity. Such materials behave more as thermoplastic materials.

The synthetic scheme of the present invention provides a versatile method for obtaining a wide array of oligomeric phthalonitrile monomers of varying average molecular weight. The synthesis is performed by mixing the reactants (any bisphenol 2, 3, and 4) together in one reaction vessel. By increasing the distance between the terminal phthalonitrile moieties and by incorporating flexibility into the interconnecting unit by means of the ether linkages, the toughness of the corresponding polymers should be enhanced. In essence, the crosslinking density of 6 can be readily controlled as a function of the molar ratios of 2 and 3 used in the synthesis of 1. Moreover, lightly crosslinked thermosetting polymers 6, formed from 1 with long interconnecting linkages, would be expected to exhibit mechanical properties similar to thermoplastics.

The polymerization of the oligomeric monomer mixture 1 can be done neat or in the presence of a curing additive.

Polymerization in a dipolar aprotic solvent to a prepolymer stage (B-stage) could provide a thermoset polymer with some voids. High molecular weight oligomeric phthalonitrile monomer mixture 1 can also be mixed in a dispersing medium, to reduce the viscosity and enhance the polymerization conditions.

Neat polymerization of 1 can provide a void-free or essentially void-free polymer. In neat polymerization, the oligomeric monomer mixture 1 is heated at a temperature from at least about the melting point or the softening point of the monomer or of the monomer/dispersing medium. The preferred polymerization or cure temperature is from about 10° C. above the melting or softening point of the monomer or of the monomer/dispersing medium to about 30° C. below the decomposition temperature of the resulting resin. The decomposition temperature is the temperature at which a polymer sample starts to lose weight as determined by thermogravimetric (TGA) analysis. The polymer is usually postcured at a temperature from about 100° C. to 30° C. and preferably from 70° C. to about 50° C. below the decomposition temperature. The length of time of cure and postcure depends on the properties desired.

It is possible to terminate the polymerization at the B-stage which is determined by an increase in viscosity. Upon cooling, the B-staged prepolymer is a fragile solid which can be broken into a powder. The powder can be stored indefinitely under ambient conditions. To use the B-staged resin, the powder is placed in a mold or admixed with, e.g., carbon fibers and is heated to the above cure temperature range or is dispersed in an appropriate solvent and deposited on carbon fibers (prepreg). The prepreg is then used to fabricate composite components. The cure proceeds as described above.

Polymerization in a dipolar aprotic solvent comprises dissolving the oligomeric phthalonitrile monomer 1/curing additive mixture in a solvent to form a solution, heating the solution until the B-stage (prepolymer) is reached, removing the solvent at reduced pressure, polymerizing the B-stage to the C-stage by heating the prepolymer to the polymerization temperature range, and curing the prepolymer at the above curing-temperature range.

The rate of polymerization is increased by the inclusion of the curing agent. If a curing agent is used, the curing agent can be any organic nucleophilic amine curing agent, diamine, polyamine or amine substituted phosphazene, phenol, strong acid, organic acid, metal or metallic salt such as chromium, molybdenum, vanadium, beryllium, silver, mercury, aluminum, tin, lead, antimony, calcium, barium, manganese, magnesium, zinc, copper, iron, cobalt, nickel, palladium, platinum, cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride (2TPPO/SnCl$_2$) and mixtures thereof. The curing agents may be used in the same amounts as conventionally used in curing analogous prior art monomers.

Exemplary curing agents include primary or secondary amines, and phenols, strong acids, organic acids, metals and metallic salts. The preferred amines are meta- and para-phenylene diamine, meta- and para-alkylene dianiline, aminophenyl ether, aminophthalonitrile, cyclohexane bis(alkylamine) wherein the alkyl group has from 1 to about 10 carbon atoms, alkylamine or alkyldiamine wherein the alkyl group has from about 15 to about 25 carbon atoms, aminophenylsulfone, 1,3-bis(3-aminophenoxy)benzene (known as "APB"), methylenedianiline, hexakis(4-aminophenoxy)cyclotriphosphazene strong ($K_r$–1–1×10$^{-5}$, preferably about 0.1– 1×10$^{-4}$) organic acids and inorganic acids, for example, strong mineral acids and strong aromatic acids which contain at least one aryl (such as phenyl), moiety and at least one inorganic substituent. The preferred phenols are bisphenol-S, bisphenol-A, bisphenol-A6F, resorcinol, hydroquinone, 4,4'-dihydroxybiphenyl, and bisphenol-A polysulfone represented by the following formula:

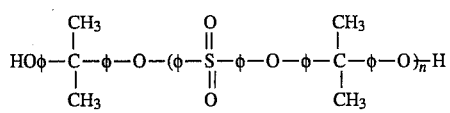

wherein n is an integer from 1 to about 5, the phenols having both para and meta attachments of phenyl groups thereof. The curing agent is added to the phthalonitrile oligomer monomer mixture when melted or in solution. For void-free applications, the curing agent is added in an amount from about 1 to about 10 weight percent of total resin weight; otherwise, the amine can be added in an amount up to 20 weight percent. Additional information concerning some appropriate curing agents for analogous prior art polymers is disclosed, for example, in U.S. Pat. No. 5,132,396, and details on the use of strong organic acids and inorganic acids are discussed in U.S. Ser. No. 07/818,672, filed Jan. 9, 1992, to Teddy M. Keller, all of which are, in their entirety, incorporated herein by reference.

The mixture of oligomeric phthalonitrile monomers, like previous phthalonitrile monomers, can be cured with a metal or metallic salt. In order to minimize gassing, quantities from catalytic to stoichiometric amounts, based on a hypothetical phthalocyanine nucleus formation, are used. When a stoichiometric amount is used, one equivalent of a metal or salt for four equivalents of phthalonitrile monomer is added.

The preferred metals are copper, iron, zinc and nickel due to the enhanced thermal stability of the resulting resins above 250° C. Examples of other metals which may be used are chromium, molybdenum, vanadium, beryllium, silver, mercury, tin, lead, antimony, calcium, barium, manganese, magnesium, cobalt, palladium and platinum. The preferred metallic salt is stannous chloride. This increases the reaction rate the most and has the least trouble with poor dispersion and voids caused by entrapped gas. These advantages occur only if the stannous chloride is in the dihydrate form. Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof. Addition examples of metals and salts are found in Mosher, Frank H. and Thomas, Arthur L., *Phthalocyanine Compounds*, N.Y., Reinhold, 1963, p. 104–141.

Having described the invention, the following examples are given to illustrate specific applications of the invention including the best mode now known to perform the invention. These specific examples are not intended to limit the scope of the invention described in this application.

EXAMPLES

A. Synthesis of Oligomeric Multiple Aromatic Ether-Containing Phthalonitrile

Example 1

To a 100 ml, 3-necked flask equipped with a thermometer and a Dean-Stark trap was added 12.01 gm (55.1 mmol) of 4,4'-difluorobenzophenone, 20.11 gm (108.1 mmol) of 4,4'-dihydroxybiphenyl, and 70 ml of dimethylacetamide (DMAC). After flushing the mixture for 20 minutes with dry nitrogen, 21.2 gm (153.4 mmol) of pulverized anhydrous potassium carbonate was added with stirring. The Dean-Stark trap was filled with toluene. Five milliliter of toluene was also added to the reaction mixture. The mixture was then heated at 100° C. for 1 hour and at reflux (140° C.) for 12 hours total. During this time, the water formed as a by-product was removed by azeotropic distillation. After refluxing, the toluene was removed by distillation. When the temperature of the reaction mixture had reached 165° C., it was assumed that the toluene had been removed. The reaction temperature was then reduced to 90° C. whereupon 19.0 gm (109.8 mmol) of 4-nitrophthalonitrile was added. The reaction mixture turned purple. The reaction content was then stirred at 95°–100° C. for 16 hours (overnight). The reaction was monitored by FTIR spectroscopy and showed the complete disappearance of the absorptions attributed to the nitro group. The room temperature mixture was poured into 50% aqueous ethanol with stirring. The solid precipitate was collected by suction filtration, washed exhaustively with water, washed with ethanol, and dried to afford 39.8 gm of oligomeric phthalonitrile monomer. A DSC thermogram showed an endothermic transition between 260°– 280° C.

Example 2

To a 100 ml, 3-necked flask equipped with a thermometer and a Dean-Stark trap was added 3.52 gm (16.1 mmol) of 4,4'-difluorobenzophenone, 4.0 gm (21.5 mmol) of 4,4'-dihydroxybiphenyl, and 40 ml of dimethylacetamide (DMAC). After flushing the mixture for 30 minutes with dry nitrogen, 5.0 gm (36.2 mmol) of pulverized anhydrous potassium carbonate was added with stirring. The reaction content was stirred at 90° C. for 1 hour. Toluene was added to the Dean-Stark trap and to the reaction vessel (4 ml). The reaction mixture was refluxed at 145°–150° C. for 10 hours. Water which formed as a by-product was removed by azeotropic distillation. The toluene was removed by distillation while heating to 160° C. Upon cooling to ambient condition, 1.86 gm (10.7 mmol) of 4-nitrophthalonitrile was added. The reaction mixture turned purple. The reaction content was then stirred at the ambient temperature for 2 hours and at 90° C. for 6 hours. The reaction was monitored by FTIR spectroscopy and showed the complete disappearance of the absorptions attributed to the nitro and hydroxyl groups. The room temperature mixture was poured into 200 ml of water with stirring. The solid precipitate was collected by suction filtration, washed exhaustively with water, and dried to afford 7.8 gm of oligomeric phthalonitrile monomer.

Example 3

To a 100 ml, 3-necked flask equipped with a thermometer and a Dean-Stark trap was added 4.0 gm (18.4 mmol) of 4,4'-difluorobenzophenone, 12.33 gm (36.7 mmol) of bisphenol A6F, and 40 ml of dimethylacetamide (DMAC). After flushing the mixture for 30 minutes with dry nitrogen, 10.1 gm (73.4 mmol) of pulverized anhydrous potassium carbonate was added with stirring. The light pink reaction mixture was stirred at 90° C. for 1 hour. Toluene was added to the Dean-Stark trap and to the reaction vessel (4 ml). The reaction mixture was refluxed at 145°–150° C. for 26 hours. Water which formed as a by-product was removed by azeotropic distillation. The toluene was removed by distillation while heating to 160° C. Upon cooling to 50° C., 6.37 gm (36.8 mmol) of 4-nitrophthalonitrile was added. The reaction mixture was observed to be viscous. The temperature of reaction mixture was increased to 110° C. and held at this temperature for 16 hours (overnight). The room temperature mixture was poured into 200 ml of water with stirring. The solid precipitate was collected by suction filtration, washed exhaustively with water, and dried to afford 20.1 gm of oligomeric phthalonitrile monomer.

Example 4

To a 100 ml, 3-necked flask equipped with a thermometer and a Dean-Stark trap was added 5.0 gm (22.9 mmol) of 4,4'-difluorobenzophenone, 11.56 gm (36.7 mmol) of bisphenol A6F, and 40 ml of dimethylacetamide (DMAC). After flushing the mixture for 30 minutes with dry nitrogen, 7.6 gm (55.1 mmol) of pulverized anhydrous potassium carbonate was added with stirring. The light pink reaction mixture was stirred at 90° C. for 1 hour. Toluene was added to the Dean-Stark trap and to the reaction vessel (4 ml). The reaction mixture was refluxed at 145°–150° C. for 10 hours. Water which formed as a by-product was removed by azeotropic distillation. The toluene was removed by distillation while heating to 160° C. Upon cooling to room temperature, 6.37 gm (36.8 mmol) of 4-nitrophthalonitrile was added. The temperature of reaction mixture was increased to 70° C. and held at this temperature for 16 hours (overnight). The temperature was further increased to 110° C. and held for 1 hour. The room temperature mixture was poured into 400 ml of water with stirring to break the precipitate into a powdery form. The solid precipitate was collected by suction filtration, washed exhaustively with water, and dried to afford 16.9 gm of oligomeric phthalonitrile monomer.

Example 5

To a 100 ml, 3-necked flask equipped with a thermometer and a Dean-Stark trap was added 7.81 gm (35.8 mmol) of 4,4'-difluorobenzophenone, 15.01 gm (44.4 mmol) of bisphenol A6F, and 50 ml of dimethylacetamide (DMAC). After flushing the mixture for 30 minutes with dry nitrogen, 9.5 gm (68.4 mmol) of pulverized anhydrous potassium carbonate was added with stirring. The light pink reaction mixture was stirred at 100° C. for 1 hour. Toluene was added to the Dean-Stark trap and to the reaction vessel (4 ml). The reaction mixture was refluxed at 145°–150° C. for 10 hours. Water which formed as a by-product was removed by azeotropic distillation. The toluene was removed by distillation while heating to 160° C. Upon cooling to 70° C., 3.10 gm (17.9 mmol) of 4-nitrophthalonitrile was added and permitted to stir for 60 hours (weekend). The room temperature mixture was poured into 400 ml of water with stirring to break the precipitate into a powdery form. The solid precipitate was collected by suction filtration, washed exhaustively with water and with 400 ml of absolute methanol, and dried to afford 23.3 gm of oligomeric phthalonitrile monomer.

Example 6

To a 100 ml, 3-necked flask equipped with a thermometer and a Dean-Stark trap was added 5.0 gm (22.9 mmol) of 4,4'-difluorobenzophenone, 8.03 gm (23.9 mmol) of bisphenol A6F, and 50 ml of dimethylacetamide (DMAC). After flushing the mixture for 30 minutes with dry nitrogen, 3.9 gm (28.7 mmol) of pulverized anhydrous potassium carbonate was added with stirring. The reaction mixture was stirred at 70° C. for 1 hour. Toluene was added to the Dean-Stark trap and to the reaction vessel (4 ml). The reaction mixture was refluxed at 145°–150° C. for 24 hours. Water which formed as a by-product was removed by azeotropic distillation. The toluene was removed by distillation while heating to 160° C. Upon cooling to 50° C., 3.10 gm (17.9 mmol) of 4-nitrophthalonitrile was added. Since the reaction mixture was somewhat viscous, the temperature of the mixture was increased to 110° C. and held at this temperature for 18 hours (overnight). FTIR spectroscopy showed the absence of hydroxy and nitro bands. The room temperature mixture was then poured into 300 ml of water with stirring to break the precipitate into a powdery form. The solid precipitate was collected by suction filtration, washed exhaustively with water, and dried to afford 11.5 gm of oligomeric phthalonitrile monomer.

Example 7

To a 100 ml, 3-necked flask equipped with a thermometer and a Dean-Stark trap was added 2.0 gm (9.2 mmol) of 4,4'-difluorobenzophenone, 6.16 gm (18.3 mmol) of bisphenol A6F, and 50 ml of N-methyl pyrrolidinone (NMP). After flushing the mixture for 30 minutes with dry nitrogen, 5.0 gm (36.2 mmol) of pulverized anhydrous potassium carbonate was added with stirring. The reaction mixture was stirred at 70° C. for 1 hour. Toluene was added to the Dean-Stark trap and to the reaction vessel (4 ml). The reaction mixture was refluxed at 175°–180° C. for 12 hours. Water which formed as a by-product was removed by azeotropic distillation. The reaction temperature was reduced to 160° C. and the toluene was sweep out of the reaction vessel by removing the glass stopper from the 3-necked flask. When the temperature reached 180° C., it was assumed that the toluene had been removed. Upon cooling to room temperature, 3.17 gm (18.4 mmol) of 4-nitrophthalonitrile was added. The temperature of the mixture was increased to 100° C. and held at this temperature for 4 hours. FTIR spectroscopy showed the absence of hydroxy and nitro bands. The room temperature mixture was then poured into 300 ml of water with stirring. The solid precipitate was collected by suction filtration, washed exhaustively with water, and dried to afford 9.1 gm of oligomeric phthalonitrile monomer.

Example 8

To a 100 ml, 3-necked flask equipped with a thermometer and a Dean-Stark trap was added 5.0 gm (22.9 mmol) of 4,4'-difluorobenzophenone, 11.56 gm (34.4 mmol) of bisphenol A6F, and 80 ml of N-methyl pyrrolidinone (NMP). After flushing the mixture for 30 minutes with dry nitrogen, 7.6 gm (55.1 mmol) of pulverized anhydrous potassium carbonate was added with stirring. The reaction mixture was stirred at 100° C. for 1 hour. Toluene was added to the Dean-Stark trap and to the reaction vessel (4 ml). The reaction mixture was refluxed at 175°–180° C. for 12 hours. Water which formed as a by-product was removed by azeotropic distillation. The reaction temperature was reduced to 160° C. and the toluene was sweep out of the reaction vessel by removing the glass stopper from the 3-necked flask. When the temperature reached 180° C., it was assumed that the toluene had been removed. Upon cooling to room temperature, 3.97 gm (22.9 mmol) of 4-nitrophthalonitrile was added. The temperature of the mixture was increased to 100° C. and held at this temperature for 4 hours. FTIR spectroscopy showed the absence of hydroxy and nitro bands. The room temperature mixture was then poured into 400 ml of water with stirring. The solid precipitate was collected by suction filtration, washed exhaustively with water, and dried to afford 9.1 gm of oligomeric phthalonitrile monomer.

B. Polymerization of Oligomeric Multiple Aromatic Ether-Containing Phthalonitrile Example 9

To the melt of oligomeric phthalonitrile monomer at 200° C. prepared as in Example 3 was added 1,3-bis(3-aminophenoxy)benzene (APB, 2 wt %) with stirring. The dark polymerization mixture was cured by heating at 250° C. for 2 hours, at 280° C. for 1 hour, and at 315° C. for 16 hours. The polymer was postcured at 350° C. for 2 hours and at 375° C. for 4 hours under oxygen-free argon. The thermal and oxidative stability of the polymer as determined by TGA was found to be a function of curing additive and curing temperature. The polymer showed superb stability when cured at maximum temperature of 315° C. Further heating to 375° C. under inert conditions resulted in an improvement in the thermal stability. The thermo-oxidative properties were investigated between 25° and 600° C. Samples of the polymer were compared in relation to the temperature that the materials commenced to lose weight and catastrophic decomposition occurred. The polymer showed excellent oxidative stability when cured at maximum temperature of 315° C. The polymer commenced to loss weight at a higher temperature upon postcuring at 375° C.

Example 10

To the melt of oligomeric phthalonitrile monomer at 200° C. prepared as in Example 3 was added p-toluenesulfonic acid (2 wt %) with stirring. The dark polymerization mixture was cured by heating at 250° C. for 2 hours, at 280° C. for 1 hour, and at 315° C. for 10 hours. The polymer was postcured at 350° C. for 2 hours and at 375° C. for 4 hours under oxygen-free argon. The thermal and oxidative stability of the polymer as determined by TGA was found to be a function of curing additive and curing temperature. The polymer showed superb stability when cured at maximum temperature of 315° C. Further heating to 375° C. under inert conditions resulted in an improvement in the thermal stability. The thermo-oxidative properties were investigated between 30° and 600° C. Samples of the polymer were compared in relation to the temperature that the materials commenced to lose weight and catastrophic decomposition occurred. The polymer showed excellent oxidative stability when cured at maximum temperature of 315° C. Surprisingly, the polymer commenced to loss weight at a lower temperature upon postcuring at 375° C.

Example 11

To the melt of oligomeric phthalonitrile monomer at 200° C. prepared as in Example 3 was added 1,3-bis(3-aminophenoxy)benzene (APB, 1.5 wt %) with stirring. The dark polymerization mixture was cured by heating at 250° C. for 2 hours, at 280° C. for 1 hour, and at 315° C. for 16 hours. The polymer was postcured at 350° C. for 2 hours and at 375° C. for 4 hours under oxygen-free argon. The cured and postcured samples had good thermal and oxidative properties.

Example 12

To the melt of oligomeric phthalonitrile monomer at 200° C. prepared as in Example 3 was added 1,3-bis(3-aminophenoxy)benzene (APB, 1.0 wt %) with stirring. The dark polymerization mixture was cured by heating at 250° C. for 2 hours, at 280° C. for 1 hour, and at 315° C. for 16 hours. The polymer was postcured at 350° C. for 2 hours and at 375° C. for 4 hours under oxygen-free argon. The cured and postcured samples had good thermal and oxidative properties.

Example 13

To the melt of oligomeric phthalonitrile monomer at 200° C. prepared as in Example 3 was added 1,3-bis(3-aminophenoxy)benzene (APB, 3 wt %) with stirring. The dark polymerization mixture was cured by heating at 250° C. for 2 hours, at 280° C. for 1 hour, and at 315° C. for 8 hours. The polymer was postcured at 350° C. for 2 hours and at 375° C. for 4 hours under oxygen-free argon.

Example 14

To the melt of oligomeric phthalonitrile monomer at 200° C. prepared as in Example 3 was added methylenedianiline (MDA, 1.5 wt %) with stirring. The dark polymerization mixture was cured by heating at 250° C. for 2 hours, at 280° C. for 1 hour, and at 315° C. for 16 hours. The polymer was postcured at 350° C. for 2 hours and at 375° C. for 4 hours under oxygen-free argon. The cured and postcured samples had good thermal and oxidative properties.

Example 15

To the melt of oligomeric phthalonitrile monomer at 200° C. prepared as in Example 3 was added hexakis(4-aminophenoxy)cyclotriphosphazene (Hexa-3000, 1.5 wt %) with stirring. The dark polymerization mixture was cured by heating at 250° C. for 2 hours, at 280° C. for 1 hour, and at 315° C. for 16 hours. The polymer was postcured at 350° C. for 2 hours and at 375° C. for 4 hours under oxygen-free argon. The cured and postcured samples had good thermal and oxidative properties.

Example 16

To the melt of oligomeric phthalonitrile monomer at 200° C. prepared as in Example 1 was added 1,3-bis(3-aminophenoxy)benzene (APB, 1.5 wt %) with stirring. The dark polymerization mixture was cured by heating at 200° C. for 2 hours, at 280° C. for 1 hour, and at 315° C. for 16 hours. The polymer was postcured at 350° C. for 2 hours and at 375° C. for 4 hours under oxygen-free argon. The cured and postcured samples had good thermal and oxidative properties.

Example 17

To the melt of oligomeric phthalonitrile monomer at 200° C. prepared as in Example 3 was added 1,3-bis(3-aminophenoxy)benzene (APB, 4 wt %) with stirring. The dark polymerization mixture was cured by heating at 200° C. for 1 hours, at 280° C. for 1 hour, and at 315° C. for 6 hours. The polymer was postcured at 350° C. for 2 hours and at 375° C. for 4 hours under oxygen-free argon.

Example 18

To the oligomeric phthalonitrile monomer of Example 6 (4 mg of monomer) was added 0.08 mg (2 wt %) of 1,3-bis(3-aminophenoxy)benzene in a DSC pan. The DSC thermogram from 30° to 330° C. showed an endothermic transition at 106 attributed to the melting point and an exothermic transition peaking at 267° C. attributed to reaction of APB with the monomer. Upon cooling and rerunning, the sample exhibited a glass transition temperature ($T_g$) at 125° C. Further heat treatment resulted in an increase of the $T_g$. The glass transition temperature was a function of the curing temperature and curing time.

Example 19

To the melt (1 gm) of oligomeric phthalonitrile monomer at 200° C. prepared as in Example 3 was added a trace amount of concentrated sulfuric acid (small drop) with stirring. The dark polymerization mixture was cured by heating at 200° C. for 1 hours, at 280° C. for 1 hour, and at 315° C. for 6 hours. Gelation occurred during the heat treatment.

Example 20

To the melt (0.5 gm) of oligomeric phthalonitrile monomer at 200° C. prepared as in Example 3 was added phenylphosphonic acid with stirring. The dark polymerization mixture was cured by heating at 200° C. for 1 hours, at 280° C. for 1 hour, and at 315° C. for 6 hours. Gelation occurred during the heat treatment.

Obviously, many modifications and variations of the present invention are possible in light of the above teachings. It is therefore to be understood that, within the scope of the appended claims, the invention may be practiced otherwise than as specifically described.

What is claimed is:

1. An arylether-containing phthalonitrile monomer having the formula:

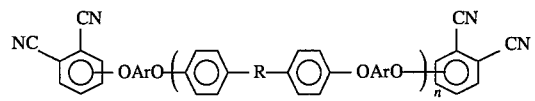

wherein AR represents an aromatic group, R represents

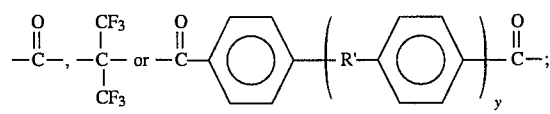

R' represents

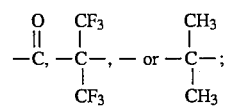

y is an integer having a value of 0 to 4; and n represents an average value of from 1 to about 100.

2. The monomer of claim 1, wherein Ar has from 1 to 3 aromatic rings, attached or fused, said rings being attached directly or through an aliphatic group, sulfur or oxygen.

3. The monomer of claim 1, wherein Ar represents a unit selected from the group consisting of phenylene, diphenylene, terpenylene, anthracenediyl, naphthalendiyl, and phenanthrenediyl.

4. The monomer of claim 3, wherein Ar is a phenylene or diphenylene unit.

5. The monomer of claim 2, wherein Ar is selected from the group consisting of:

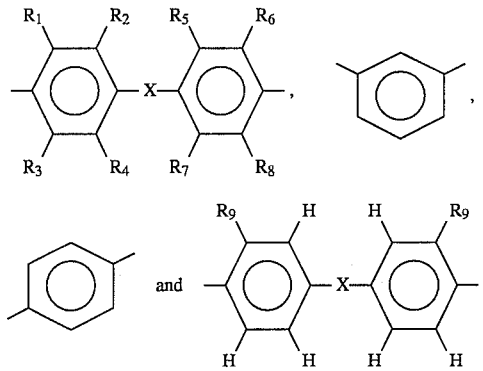

wherein X is selected from the group consisting of

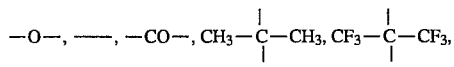

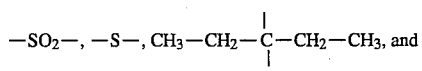

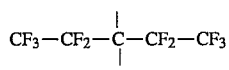

and $R_1$, $R_2$, $R_3$, $R_4$, $R_5$, $R_6$, $R_7$ and $R_8$ are selected from the group consisting of hydrogen, fluoride, methyl and ethyl, and $R_9$ is selected from the group consisting of bromine, chlorine and fluorine.

6. The monomer of claim 5, wherein $R_1$ through $R_8$ are hydrogen.

7. The monomer of claim 5, wherein X is selected from the group consisting of

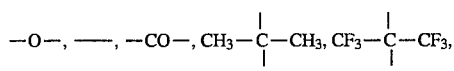

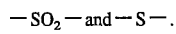

8. The monomer of claim 7, wherein X is selected from the group consisting of:

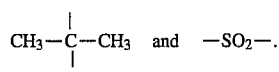

9. The monomer of claim 7, wherein X is selected from the group consisting of:

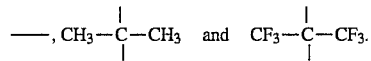

10. A method of preparing an arylether-containing phthalonitrile monomer having the formula:

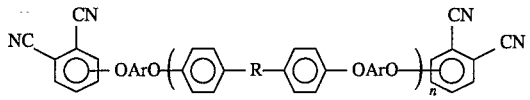

wherein AR represents an aromatic group, R represents

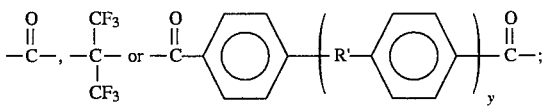

R' represents

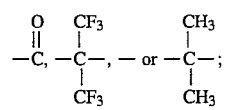

y is an integer having a value of 0 to 4; and n represents an average value of from 1 to about 100, comprising the steps of:

admixing HOArOH and

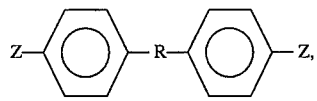

where R has the meaning given above and Z is F, Cl or Br, in an inert, oxygen-free atmosphere and in the presence of an inorganic base of metal an alkali metal M selected from the group consisting of potassium, sodium and lithium, a dipolar aprotic solvent, and an inert refluxing medium, to form:

a dialkaline metal bisphenate having the formula:

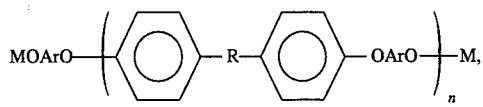

wherein Ar, R, y and n have the meaning given above;

reacting said dialkaline metal bisphenate with a stoichiometric amount of a reactant selected from the group consisting of 4-nitrophthalonitrile and 3-nitrophthalonitrile, at a temperature of from about 65° C. to about 85° C., until said monomer is produced.

11. The method of claim 10, wherein said inorganic base of said alkali metal M is potassium carbonate, potassium bicarbonate, sodium carbonate, sodium bicarbonate or sodium hydride.

* * * * *